United States Patent
Jang et al.

(10) Patent No.: US 7,626,656 B2
(45) Date of Patent: Dec. 1, 2009

(54) LCD DEVICE FOR SWITCHING DISPLAY MODE BETWEEN WIDE VIEWING ANGLE AND NARROW VIEWING ANGLE AND METHOD EMPLOYING CONTROL CELL FOR CONTROLLING TILT ANGLE OF MOLECULES OF DICHROIC LIQUID CRYSTAL LAYER THEREIN

(75) Inventors: Hyung-Seok Jang, Gyeonggi-do (KR); Hyun-Suk Jin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 478 days.

(21) Appl. No.: 11/316,971

(22) Filed: Dec. 27, 2005

(65) Prior Publication Data

US 2007/0002238 A1    Jan. 4, 2007

(30) Foreign Application Priority Data

Jun. 30, 2005  (KR) ............... 10-2005-0058942

(51) Int. Cl.
*G02F 1/1347* (2006.01)

(52) U.S. Cl. .................. 349/74; 349/77; 349/83
(58) Field of Classification Search ........... 349/74–83
See application file for complete search history.

(56) References Cited

U.S. PATENT DOCUMENTS

2004/0125298 A1*  7/2004  Oh et al. ............... 349/129

* cited by examiner

*Primary Examiner*—John Heyman
(74) *Attorney, Agent, or Firm*—Holland & Knight LLP

(57) ABSTRACT

A liquid crystal display (LCD) device for switching a display mode between a wide viewing angle and a narrow viewing angle includes an LCD panel including an array substrate, a color filter substrate, and a liquid crystal layer formed between inner surfaces of the array substrate and the color filter substrate, and a viewing angle control cell adjacent to the LCD panel, the viewing angle control cell including a lower substrate on which a first electrode is formed, an upper substrate on which a second electrode is formed, and a dichroic liquid crystal layer interposed between the upper substrate and the lower substrate.

18 Claims, 2 Drawing Sheets

$a$ : ABSORPTION, $a_\parallel > a_\perp$

LCD DEVICE FOR SWITCHING DISPLAY MODE BETWEEN WIDE VIEWING ANGLE AND NARROW VIEWING ANGLE AND METHOD EMPLOYING CONTROL CELL FOR CONTROLLING TILT ANGLE OF MOLECULES OF DICHROIC LIQUID CRYSTAL LAYER THEREIN The present invention claims the benefit of Korean Patent Application No. 58942/2005 filed in Korea on Jun. 30, 2005, which is hereby incorporated by reference in its entirety.

BACKGROUND OF THE INVENTION

1. Field of the Invention

The present invention relates to a display device and a method for fabricating the same, and more particularly, to an LCD device for switching a display mode between a wide viewing angle and a narrow viewing angle and a method for fabricating the same.

2. Description of the Background Art

In general, a liquid crystal display (LCD) device is used as a flat panel display device because of its high picture quality and a low consumption power. The LCD device is constructed to control an optical transmittance of a liquid crystal between two substrates by controlling the intensity of an electric field applied across the liquid crystal layer. The LCD device is being widely used in notebook computers, personal digital assistants (PDAs), video telephones, televisions and various other portable electronic devices.

In response to user's demand, LCD devices are being developed that have a large screen, fine pitch, and a wide viewing angle. There are two types of related art LCD devices having a wide viewing angle. The first is an LCD device driven by a horizontal field driving method and the second is an LCD device using a compensated film with a vertical alignment (VA) method.

In the LCD device driven by a horizontal field driving method, a pixel electrode and a common electrode are formed on the same substrate. An electric field horizontal to the substrate is formed between the pixel electrode and the common electrode when the pixel electrode is turned on. Accordingly, a long axis of the liquid crystal molecules is operated in parallel with the substrate corresponding to the on/off state of the pixel electrode. As a result, a refractive index of the liquid crystal observed by the user's naked eyes remains small so that there in an excellent contrast ratio and a wide viewing angle.

In the LCD device using a compensated film with a vertical alignment (VA) method, a wide viewing angle is implemented by attaching a compensation film at an inner side of a polarizing plate. More particularly, the LCD device using a compensated film with a vertical alignment (VA) method includes a pair of transparent substrates each having a transparent electrode at an inner surface thereof. Polarizing plates, which are perpendicular to each other, are at outer surfaces of the pair of transparent substrates. The compensation film is between one of the transparent substrates and one of the polarizing plates. A liquid crystal material between the two substrates is aligned to be perpendicular to the substrate by rubbing at least one of the electrodes. Recently, a mode in which the liquid crystal molecules are divided into groups by forming an opening pattern or a protrusion on a transparent electrode without performing a rubbing has been proposed. A typical LCD device for implementing a viewing angle will be explained with reference to FIG. 1.

FIG. 1 is a cross-sectional view of a liquid crystal display (LCD) device in accordance with the related art. As shown in FIG. 1, the related art LCD device includes a thin film transistor (TFT) array substrate 11 and a color filter substrate 41 facing and attached to the TFT array substrate 11 with a cell gap therebetween. A liquid crystal layer 51 is formed in the cell gap between the TFT array substrate 11 and the color filter substrate 41.

On the TFT array substrate 11, pixels are arranged in a matrix form. A thin film transistor 20, a pixel electrode 27, and a capacitor (not shown) are formed in each pixel. The thin film transistor 20 includes a gate electrode 13 formed on the TFT array substrate 11, a gate insulating layer 15 formed on the gate electrode 13, a semiconductor layer 17 formed on the gate insulating layer 15, and source/drain electrodes 21 and 23 formed on the semiconductor layer 17 and spaced from each other. A passivation layer 25 is formed across a surface of the TFT array substrate 11, including the source/drain electrodes 21 and 23. A pixel electrode 27 is electrically connected to the drain electrode 23 through a drain contact hole (not shown) formed in a passivation layer 25.

Red, Green, and Blue color filters 45 in a black matrix 43 are formed on the color filter substrate 41 for implementing colors in the LCD device. A common electrode 47 is formed on the color filter substrate 41 for applying an electric field to the liquid crystal layer 51. An alignment layer (not shown) is formed at an inner surface of the TFT array substrate 11 and at an inner surface of the color filter substrate 41. The liquid crystal 51 is oriented (not shown) in a predetermined direction by rubbing the alignment layer (not shown).

The color filter substrate 41 and the TFT array substrate 11 are respectively provided with a first polarizing plate 61 and a second polarizing plate 63. The polarizing plates 61 and 63 polarize natural light having vibrations in several directions into one direction. The liquid crystal is rotated by a dielectric anisotropy when an electric field is applied between the pixel electrode 27 formed at each pixel of the TFT array substrate 11 and the common electrode 47 formed at the inner surface of the color filter substrate 41. Accordingly, images are displayed by passing the polarized light through specified pixels and/or by preventing the polarized light from passing through specified pixels.

In the LCD device, light 71 from a backlight is emitted to a back surface of an LCD panel through several diffusion sheets (not shown) in order to obtain a uniform brightness. As the light passes through to the front surface of the LCD panel, an image can be displayed with a wide viewing angle by using a compensation film between the color filter substrate 41 and the polarizing plate 61. Otherwise, the related art LCD device in FIG. 1 will have a narrow viewing angle.

The related art LCD device has the following problems. A wide viewing angle can not be actively controlled so as to have a narrower viewing angle. Although not shown, a viewing angle can be narrowed by applying a film-type filter or an optical fiber to the LCD panel. Typically, a narrower viewing angle is brighter than a wide viewing angle. However, a display mode in the related art can not be switched between a wide viewing angle and a narrow viewing angle.

BRIEF DESCRIPTION OF THE INVENTION

Accordingly, the present invention is directed to an LCD device for switching a display mode between a wide viewing angle and a narrow viewing angle and a method for fabricating the same that substantially obviates one or more of the problems due to limitations and disadvantages of the related art.

An object of the present invention is to provide a liquid crystal display (LCD) device for switching a display mode between a wide viewing angle and a narrow viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display (LCD) device for switching a display mode between a wide viewing angle and a narrow viewing angle includes an LCD panel including an array substrate, a color filter substrate, and a liquid crystal layer formed between inner surfaces of the array substrate and the color filter substrate, and a viewing angle control cell adjacent to the LCD panel, the viewing angle control cell including a lower substrate on which a first electrode is formed, an upper substrate on which a second electrode is formed, and a dichroic liquid crystal layer interposed between the upper substrate and the lower substrate.

In another aspect, a method for fabricating a liquid crystal display device for switching a display mode between a wide viewing angle and a narrow viewing angle includes providing an array substrate and a color filter substrate, interposing a liquid crystal layer between the array substrate and the color filter substrate to thereby form an LCD panel, and forming a viewing angle control cell by forming a first electrode at a lower substrate, by forming a second electrode at an upper substrate, and by interposing a dichroic liquid crystal layer between the upper substrate and the lower substrate, and then arranging the viewing angle control cell at the LCD panel.

In another aspect, a liquid crystal display (LCD) device for switching a display mode between a wide viewing angle and a narrow viewing angle includes a wide viewing angle LCD panel including an array substrate, a color filter substrate, and a liquid crystal layer formed between inner surfaces of the array substrate and the color filter substrate, and a viewing angle control cell adjacent to the wide viewing angle LCD panel, the viewing angle control cell including a lower substrate on which a first electrode is formed, an upper substrate on which a second electrode is formed, and liquid crystal molecules between the first and second electrodes, the tilt angle of the liquid crystal molecules is controlled such that off-angle light is decreased to implement a narrow viewing angle mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings. A liquid crystal display (LCD) device for switching a display mode between a wide viewing angle and a narrow viewing angle according to one embodiment of the present invention will be explained with reference to FIGS. 2 to 4.

Figure 1:
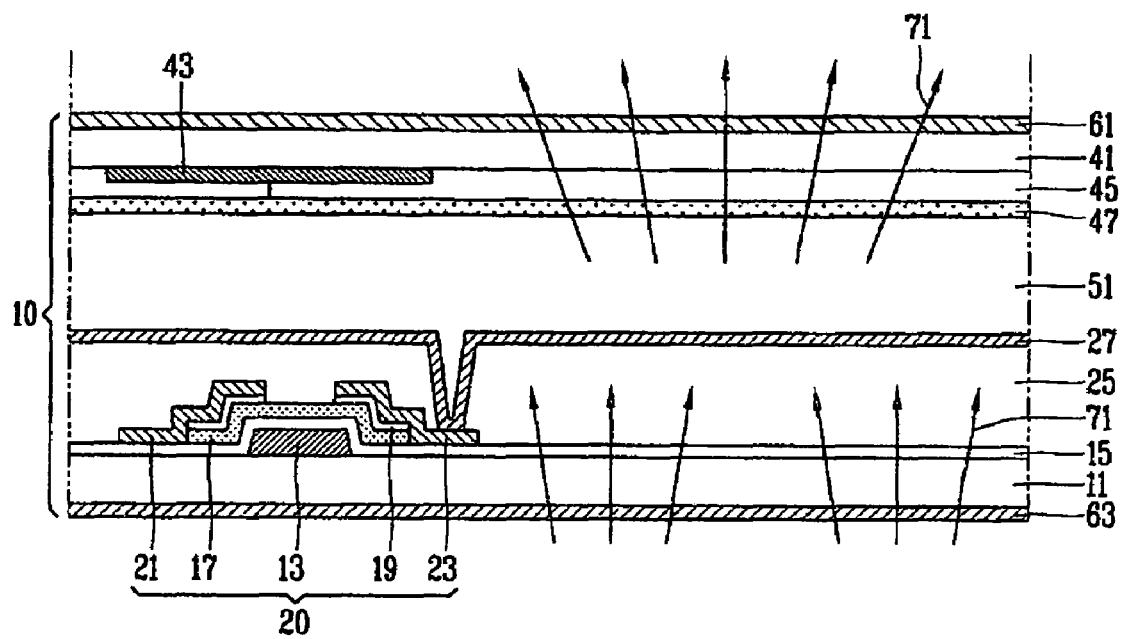
FIG. 1 is a cross-sectional schematic view of a liquid crystal display (LCD) device in accordance with the related art.
Figure 2:
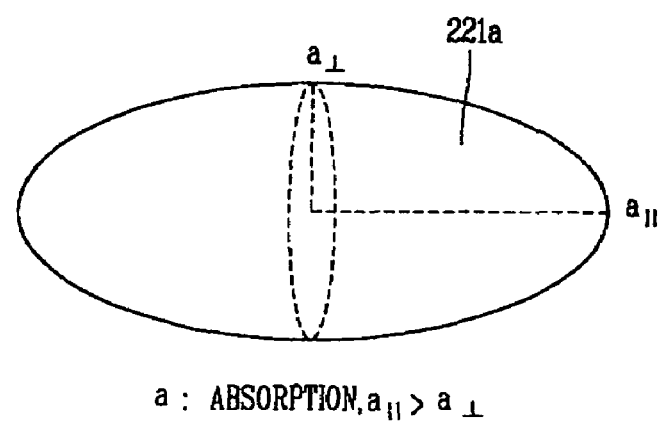
FIG. 2 is a cross-sectional view of a characteristic of a dichroic liquid crystal in an LCD device for switching a display mode between a wide viewing angle and a narrow viewing angle according to one embodiment of the present invention.
Figure 3:
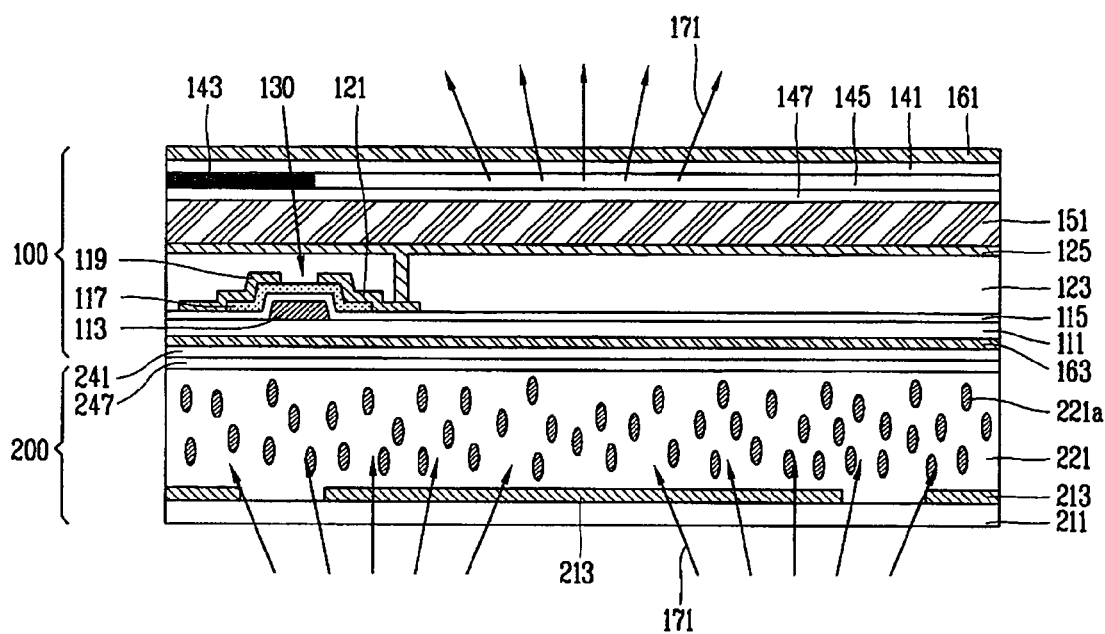
FIG. 3 is a schematic view of a wide viewing angle mode when a signal is not applied to a viewing angle control cell in the LCD device for switching a display mode between a wide viewing angle and a narrow viewing angle according to one embodiment of the present invention.
Figure 4:
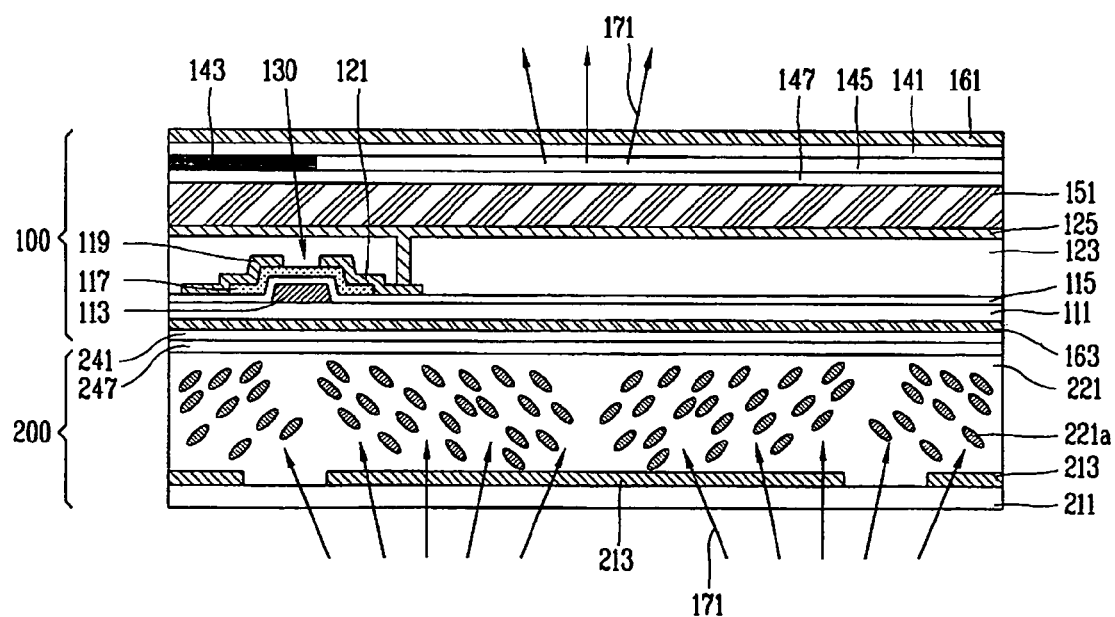
FIG. 4 is a schematic view of a narrow viewing angle mode when a signal is applied to a viewing angle control cell in the LCD device for switching a display mode between a wide viewing angle and a narrow viewing angle according to one embodiment of the present invention.

FIG. 2 is a cross-sectional view of a characteristic of a dichroic liquid crystal in an LCD device for switching a display mode between a wide viewing angle and a narrow viewing angle according to one embodiment of the present invention. FIG. 3 is a schematic view of a wide viewing angle mode when a signal is not applied to a viewing angle control cell in the LCD device for switching a display mode between a wide viewing angle and a narrow viewing angle according to one embodiment of the present invention. FIG. 4 is a schematic view of a narrow viewing angle mode when a signal is applied to a viewing angle control cell in the LCD device for switching a display mode between a wide viewing angle and a narrow viewing angle according to one embodiment of the present invention. As shown in FIG. 2, a dichroic liquid crystal molecule 221$a$ has a different light absorption ratio ($\alpha$) along the long axis $a_\parallel$ of the molecule than along the short axis $a\perp$ of the molecule. More specifically, the absorption ratio ($\alpha$) along the long axis $a_\parallel$ of the dichroic liquid crystal molecule 221$a$ is greater than along the short axis $a_\perp$ of the dichroic liquid crystal molecule 221$a$. Thus, the dichroic liquid crystal molecule 221$a$ has a greater absorption ratio when the longer axis $a_\parallel$ is positioned in parallel with a light path as compared to when the longer axis $a_\parallel$ of the dichroic liquid crystal molecule 221$a$ is perpendicular to the direction of the light path.

FIG. 3 is a schematic view of a wide viewing angle mode when a signal is not applied to a viewing angle control cell in the LCD device for switching a display mode between a wide viewing angle and a narrow viewing angle according to one embodiment of the present invention. FIG. 4 is a schematic view of a narrow viewing angle mode when a signal is applied to a viewing angle control cell in the LCD device for switching a display mode between a wide viewing angle and a narrow viewing angle according to one embodiment of the present invention. FIGS. 3 and 4 show the dichroic liquid crystal molecule 221$a$ used in a viewing angle control cell 200. Referring to FIGS. 3 and 4, a liquid crystal display (LCD) device for switching a display mode between a wide viewing angle and a narrow viewing angle according to an embodiment of the present invention includes a backlight (not shown), a viewing angle control cell 200 disposed above the backlight, and an LCD panel 100 with a wide viewing angle disposed above the viewing angle control cell 200. In the alternative, the viewing angle control cell 200 can be disposed above the LCD panel 100. In other words, the viewing angle control cell can be disposed adjacent to an outer surface of one of the color filter substrate 141 and the TFT array substrate 111.

The viewing angle control cell 200 includes a lower substrate 211, a first electrode 213 formed on the lower substrate 211, an upper substrate 241 spaced from the lower substrate 211 by a gap, a second electrode 247 formed on the upper substrate 241, and a dichroic liquid crystal layer 221 interposed between the lower substrate 211 and the upper substrate 241.

The LCD panel 100 with a wide viewing angle includes a thin film transistor (TFT) array substrate 111, a color filter substrate 141 facing and attached to the TFT array substrate 111 with a uniform gap therebetween, and a liquid crystal layer 151 formed between the TFT array substrate 111 and the color filter substrate 141. On the TFT array substrate 111, pixels are arranged as a matrix form. A thin film transistor 130, a pixel electrode 127, and a capacitor (not shown) are formed in each pixel. The thin film transistor 130 includes a gate electrode 113 formed on the TFT array substrate 111, a gate insulating layer 115 formed over the gate electrode 113, a semiconductor layer 117 formed over the gate insulating layer 115, and spaced apart source and drain electrodes 119 and 121 formed on the semiconductor layer 117. A passivation layer 123 is formed over the thin film transistor 130. The pixel electrode 125 is formed across a surface of a passivation layer 123 and electrically connected to the drain electrode 121 through a drain contact hole (not shown) formed in the passivation layer 123.

R, Q and B color filters 145 on the color filter substrate 141 implement colors. The color filters 145 are in a black matrix 143. The color filter substrate 141 further includes a common electrode 147 for applying an electric field to the liquid crystal layer 151 together with the pixel electrode 125.

Alignment layers (not shown) are formed at the surfaces of the TFT array substrate 111 and the color filter substrate 141 that face each other. Also, liquid crystal is oriented on a surface of the alignment layer (not shown) in a specific direction by rubbing. The liquid crystal is reoriented by a dielectric anisotropy when an electric field is applied between the pixel electrode 125 formed in each pixel of the TFT array substrate 111 and the common electrode 147 formed on the color filter substrate 141. The color filter substrate 141 and the TFT array substrate 111 are respectively provided with a first polarizing plate 161 and a second polarizing plate 163 at their outside surfaces. The polarizing plates 161 and 163 polarize incident light having components going in several directions into light having a single direction (that is, polarized). Images are displayed by passing the polarized light through some pixels and by preventing the polarized light from being transmitted through the other pixels using the dielectric anisotropy of the liquid crystal.

The operation of an LCD device that can have a display mode switched between a wide viewing angle and a narrow viewing angle using a viewing angle control cell will now be described. Referring to FIG. 3, when a control signal is not applied to the viewing angle control cell 200, the light absorption ratio of the dichroic LC molecule 221a is greatest in the vertical direction, which is perpendicular between the viewing angle control cell 200 and the LCD panel 100, since the longer axis $a_\parallel$ of the dichroic liquid crystal molecule 221a is parallel to the vertical direction. However, since off-angle light 171, which is not in parallel to the vertical direction is still incident to the surface of the LCD panel, a wide viewing angle mode can be implemented.

Referring to FIG. 4, when a control signal (not shown) is applied to the viewing angle control cell 200, an electric field is formed between the first electrode 213 and the second electrode 247, the longer axis $a_\parallel$ of the dichroic liquid crystal molecule 221a is tilted toward a horizontal direction away from the vertical direction, which is perpendicular between the viewing angle control cell 200 and the LCD panel 100. More particularly, the longer axis $a_\parallel$ of the dichroic liquid crystal molecule 221a tilts due to the electric field between the first electrode 213 and the second electrode 247. The first electrode 213 and the second electrode 247 are formed of transparent material such as ITO. When the dichroic liquid crystal molecule 221a is tilted within a range of angle of 0°~90°, incident light 171 with an inclined angle corresponding to the tilt angle of the longer axis $a_\parallel$ of the dichroic liquid crystal molecule 221a can be effectively absorbed such that the incidence of off-angle light with an inclined angle upon the front surface of the LCD panel or off-angle light with an inclined angle emanating from the back surface of the LCD panel is reduced, thereby obtaining a narrow viewing angle.

In embodiments of the present invention, a wide viewing angle and a narrow viewing angle can be selected by using dichroic liquid crystal molecules that have a different light absorption ratio in a first axial direction of the molecule than in a second axial direction of the molecule in which the second axial direction is perpendicular to the first axial direction. The viewing angle control cell including the dichroic liquid crystal molecules, is arranged at an upper surface or a lower surface of the LCD panel, and a tilt angle of the dichroic liquid crystal is controlled such that transmissivity of off-angle light, which is at the tilt angle, is decreased to or from a LCD panel. Embodiments of the present invention can be applied to each mode of LCD panel, such as a TN mode, an IPS mode, a VA mode, an FFS mode. Further, embodiments of the present invention can be used in mid-sized or small an LCD panels.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display (LCD) device for switching a display mode between a wide viewing angle and a narrow viewing angle, comprising:

an LCD panel including an array substrate, a color filter substrate, and a liquid crystal layer formed between inner surfaces of the array substrate and the color filter substrate;

a viewing angle control cell adjacent to the LCD panel, the viewing angle control cell including a lower substrate on which a first electrode is formed, an upper substrate on which a second electrode is formed, and a dichroic liquid crystal layer interposed between the upper substrate and the lower substrate, wherein the dichroic liquid crystal layer has molecules having a greater light absorption ratio along a long axis of the dichroic liquid crystal layer than along a short axis of the dichroic liquid crystal layer; and a control signal for driving the viewing angle control cell to form a narrow viewing angle mode of the LCD panel, wherein an electric field is formed between the first electrode and the second electrode so that the dichroic liquid crystal layer is tilted, light incident with an inclined angle is absorbed and light incident to a front surface of the LCD panel is transmitted, thereby forming a narrow viewing angle.

2. The device of claim 1, wherein a thin film transistor and a pixel electrode are disposed on the array substrate.

3. The device of claim 1, wherein polarizing plates are provided at outside surfaces of the array substrate and the color filter substrate.

4. The device of claim 1, wherein the viewing angle control cell is disposed adjacent to an outer surface of one of the color filter substrate and the array substrate.

5. The device of claim 1, wherein the LCD panel includes a wide viewing angle display panel.

6. The device of claim 1, wherein the first electrode and the second electrode are formed of transparent material such as ITO.

7. A method for fabricating a liquid crystal display device for switching a display mode between a wide viewing angle and a narrow viewing angle, comprising:
    providing an array substrate and a color filter substrate;
    interposing a liquid crystal layer between the array substrate and the color filter substrate to thereby form an LCD panel;
    forming a viewing angle control cell by forming a first electrode at a lower substrate, by forming a second electrode at an upper substrate, and by interposing a dichroic liquid crystal layer between the upper substrate and the lower substrate, wherein the dichroic liquid crystal layer has molecules having a greater light absorption ratio alone a long axis of the dichroic liquid crystal layer than along a short axis of the dichroic liquid crystal layer;
    arranging the viewing angle control cell at the LCD panel; and
    providing a control signal for driving the viewing angle control cell to form a narrow viewing angle mode of the LCD panel, wherein an electric field is formed between the first electrode and the second electrode so that the dichroic liquid crystal layer is tilted, light incident with an inclined angle is absorbed and light incident to a front surface of the LCD panel is transmitted, thereby forming a narrow viewing angle.

8. The method of claim 7, further comprising forming a thin film transistor and a pixel electrode on the array substrate.

9. The method of claim 7, further comprising providing polarizing plates are provided at outside surfaces of the array substrate and the color filter substrate.

10. The method of claim 7, wherein the viewing angle control cell is disposed adjacent to an outer surface of one of the color filter substrate and the array substrate.

11. The method of claim 7, wherein the LCD panel is a wide viewing angle display panel.

12. The device of claim 7, wherein the first electrode and the second electrode are formed of transparent material such as ITO.

13. A liquid crystal display (LCD) device for switching a display mode between a wide viewing angle and a narrow viewing angle, comprising:
    a wide viewing angle LCD panel including an array substrate, a color filter substrate, and a liquid crystal layer formed between inner surfaces of the array substrate and the color filter substrate;
    a viewing angle control cell adjacent to the wide viewing angle LCD panel, the viewing angle control cell including a lower substrate on which a first electrode is formed, an upper substrate on which a second electrode is formed, and a dichroic liquid crystal molecules between the first and second electrodes, the tilt angle of the dichroic liquid crystal molecules is controlled such that off-angle light is decreased to implement a narrow viewing angle mode, wherein the dichroic liquid crystal molecules have a greater light absorption ratio along a long axis of the molecules than along a short axis of the molecules; and
    a control signal for driving the viewing angle control cell to form a narrow viewing angle mode of the LCD panel, wherein an electric field is formed between the first electrode and the second electrode so that the dichroic liquid crystal molecules are tilted, light incident with an inclined angle is absorbed and light incident to a front surface of the LCD panel is transmitted, thereby forming a narrow viewing angle.

14. The device of claim 13, wherein a thin film transistor and a pixel electrode are disposed on the array substrate.

15. The device of claim 13, wherein polarizing plates are provided at outside surfaces of the array substrate and the color filter substrate.

16. The device of claim 13, wherein the viewing angle control cell is disposed adjacent to an outer surface of one of the color filter substrate and the array substrate.

17. The device of claim 13, wherein the first electrode and the second electrode are formed of transparent material such as ITO.

18. A liquid crystal display (LCD) device for switching a display mode between a wide viewing angle and a narrow viewing angle, comprising:
    a wide viewing angle LCD panel including an array substrate, a color filter substrate, and a liquid crystal layer formed between inner surfaces of the array substrate and the color filter substrate;
    polarizing plates at outside surfaces of the array substrate and the color filter substrate;
    a viewing angle control cell adjacent to the wide viewing angle LCD panel, the viewing angle control cell including a lower substrate on which a first electrode is formed, an upper substrate on which a second electrode is formed, and a dichroic liquid crystal molecules between the first and second electrodes, the tilt angle of the dichroic liquid crystal molecules is controlled such that off-angle light is decreased to implement a narrow viewing angle mode, wherein the dichroic liquid crystal molecules have a greater light absorption ratio along a long axis of the molecules than along a short axis of the molecules, wherein the viewing angle control cell is disposed adjacent to an outer surface of one of the color filter substrate and the array substrate; and
    a control signal for driving the viewing angle control cell to form a narrow viewing angle mode of the LCD panel, wherein an electric field is formed between the first electrode and the second electrode so that the dichroic liquid crystal molecules are tilted, light incident with an inclined angle is absorbed and light incident to a front surface of the LCD panel is transmitted, thereby forming a narrow viewing angle.

* * * * *